US009955507B2

(12) United States Patent
Chun et al.

(10) Patent No.: US 9,955,507 B2
(45) Date of Patent: *Apr. 24, 2018

(54) MAINTAINING COMMUNICATION BETWEEN MOBILE TERMINAL AND NETWORK IN MOBILE COMMUNICATION SYSTEM

(71) Applicant: LG ELECTRONICS INC., Seoul (KR)

(72) Inventors: Sung-Duck Chun, Anyang-si (KR); Young-Dae Lee, Gyeonggi-Do (KR); Myung-Cheul Jung, Seoul (KR); Sung-Jun Park, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,381

(22) Filed: Dec. 31, 2015

(65) Prior Publication Data
US 2016/0119955 A1 Apr. 28, 2016

Related U.S. Application Data

(63) Continuation of application No. 14/109,801, filed on Dec. 17, 2013, now Pat. No. 9,253,801, which is a (Continued)

(30) Foreign Application Priority Data

Sep. 14, 2006 (KR) .................. 10-2006-0089326

(51) Int. Cl.
*H04W 74/08* (2009.01)
*H04W 76/04* (2009.01)
(Continued)

(52) U.S. Cl.
CPC ....... *H04W 74/0833* (2013.01); *H04W 56/00* (2013.01); *H04W 76/046* (2013.01); *H04W 76/045* (2013.01); *H04W 92/10* (2013.01)

(58) Field of Classification Search
CPC ......... H04W 74/0833; H04W 76/045–76/046; H04W 92/10; H04W 4/06; H04W 72/005;
(Continued)

(56) References Cited

U.S. PATENT DOCUMENTS

| 5,659,756 A | 8/1997 | Hefferon |
| 5,754,754 A | 5/1998 | Dudley |

(Continued)

FOREIGN PATENT DOCUMENTS

| CN | 1104402 | 6/1995 |
| CN | 1267146 | 9/2000 |

(Continued)

OTHER PUBLICATIONS

3rd Generation Partnership (3GPP), Technical Specification Group GERAN; Packet-switched handover for GERAN A/Gb mode; Stage 2 (Release 6), 3GPP TS 43.129 V6.6.0, Jan. 2006, 70 pages, XP50378285.
(Continued)

*Primary Examiner* — Redentor Pasia
(74) *Attorney, Agent, or Firm* — Lee Hong Degerman Kang Waimey

(57) ABSTRACT

According to one embodiment, a method for maintaining a communication between a mobile terminal and a network in a mobile communication system includes: determining whether a state of the mobile terminal is in an unsynchronized state while maintaining a radio resource control (RRC) connected state with the network; performing a random access channel (RACH) procedure for a synchronized state if it is determined that the state of the mobile terminal is in
(Continued)

the unsynchronized state while maintaining the RRC connected state with the network; and after performing the RACH procedure, transitioning from the synchronized state to the unsynchronized state with the network while maintaining the RRC connected state with the network when a timer expires.

14 Claims, 2 Drawing Sheets

Related U.S. Application Data continuation of application No. 12/160,099, filed as application No. PCT/KR2007/000080 on Jan. 5, 2007, now Pat. No. 8,644,250.

(60) Provisional application No. 60/757,063, filed on Jan. 5, 2006, provisional application No. 60/783,250, filed on Mar. 16, 2006, provisional application No. 60/784,680, filed on Mar. 21, 2006, provisional application No. 60/784,976, filed on Mar. 22, 2006.

(51) Int. Cl.
H04W 56/00 (2009.01)
H04W 92/10 (2009.01)

(58) Field of Classification Search
CPC ... H04L 1/0026; H04L 1/0027; H04L 1/1607; H04L 5/0055; H04L 5/0057
See application file for complete search history.

(56) References Cited

U.S. PATENT DOCUMENTS

| | | | |
|---|---|---|---|
| 5,828,677 | A | 10/1998 | Sayeed |
| 6,088,342 | A | 7/2000 | Cheng |
| 6,138,158 | A | 10/2000 | Boyle |
| 6,167,248 | A * | 12/2000 | Hamalainen .......... H04W 76/02 455/403 |
| 6,317,430 | B1 | 11/2001 | Knisely |
| 6,330,448 | B1 | 12/2001 | Otsuka |
| 6,381,229 | B1 | 4/2002 | Narvinger |
| 6,421,540 | B1 | 7/2002 | Gilhousen |
| 6,480,525 | B1 | 11/2002 | Parsa |
| 6,571,102 | B1 | 5/2003 | Hogberg |
| 6,597,668 | B1 | 7/2003 | Schafer |
| 6,597,675 | B1 | 7/2003 | Esmailzadeh |
| 6,694,148 | B1 | 2/2004 | Frodigh |
| 6,717,925 | B1 | 4/2004 | Leppisaari |
| 6,728,225 | B1 | 4/2004 | Ozluturk |
| 6,785,510 | B2 | 8/2004 | Larsen |
| 6,791,963 | B1 | 9/2004 | Hwang |
| 6,795,412 | B1 | 9/2004 | Lee |
| 6,850,504 | B1 | 2/2005 | Cao |
| 6,859,445 | B1 | 2/2005 | Moon |
| 6,882,727 | B1 | 4/2005 | Vialen |
| 6,907,005 | B1 | 6/2005 | Dahlman |
| 6,907,015 | B1 | 6/2005 | Moulsley |
| 6,947,394 | B1 | 9/2005 | Johansson |
| 6,950,420 | B2 | 9/2005 | Sarkkinen et al. |
| 6,965,580 | B1 | 11/2005 | Takagi |
| 7,016,343 | B1 | 3/2006 | Mermel |
| 7,031,708 | B2 | 4/2006 | Sarkkinen |
| 7,054,289 | B1 | 5/2006 | Foster |
| 7,075,971 | B2 | 7/2006 | Parsa |
| 7,099,309 | B2 | 8/2006 | Davidson |
| 7,145,895 | B2 | 12/2006 | Mueckenheim |
| 7,151,758 | B2 | 12/2006 | Kumaki |
| RE39,454 | E | 1/2007 | Cantoni |
| 7,184,792 | B2 | 2/2007 | Mir |
| 7,236,787 | B1 | 6/2007 | Tamura |
| 7,239,870 | B2 | 7/2007 | Zhang |
| 7,359,345 | B2 | 4/2008 | Chang |
| 7,359,349 | B2 | 4/2008 | Kayama |
| 7,376,424 | B2 | 5/2008 | Kim |
| 7,385,952 | B2 | 6/2008 | Mantha |
| 7,398,108 | B2 | 7/2008 | Hondo |
| 7,430,206 | B2 | 9/2008 | Terry |
| 7,436,801 | B1 | 10/2008 | Kanterakis |
| 7,443,816 | B2 | 10/2008 | Chen |
| 7,496,113 | B2 | 2/2009 | Cai |
| 7,535,886 | B2 | 5/2009 | Lee |
| 7,590,089 | B2 | 9/2009 | Park |
| 7,664,059 | B2 | 2/2010 | Jiang |
| 7,673,211 | B2 | 3/2010 | Meyer |
| 7,729,719 | B2 | 6/2010 | Bergstrom |
| 7,778,599 | B2 | 8/2010 | Li |
| 7,826,855 | B2 | 11/2010 | Chun |
| 7,826,859 | B2 | 11/2010 | Lee |
| 7,839,829 | B2 | 11/2010 | Lee |
| 7,848,308 | B2 | 12/2010 | Lee |
| 7,881,724 | B2 | 2/2011 | Park |
| 8,031,668 | B2 | 10/2011 | Wang |
| 8,036,110 | B2 | 10/2011 | Ishii |
| 8,068,511 | B2 | 11/2011 | Reznik |
| 8,090,382 | B2 | 1/2012 | Park |
| 8,644,250 | B2 | 2/2014 | Chun et al. |
| 2001/0021197 | A1 | 9/2001 | Foore et al. |
| 2001/0024956 | A1 | 9/2001 | You |
| 2001/0030953 | A1 | 10/2001 | Chang |
| 2001/0046864 | A1 | 11/2001 | Bhatoolaul |
| 2002/0009129 | A1 | 1/2002 | Choi |
| 2002/0021698 | A1 | 2/2002 | Lee |
| 2002/0021714 | A1 | 2/2002 | Seguin |
| 2002/0028690 | A1 | 3/2002 | McKenna |
| 2002/0032884 | A1 | 3/2002 | Kobata |
| 2002/0041578 | A1 | 4/2002 | Kim |
| 2002/0044527 | A1 | 4/2002 | Jiang |
| 2002/0048316 | A1 | 4/2002 | Imaizumi |
| 2002/0071480 | A1 | 6/2002 | Marjelund |
| 2002/0080887 | A1 | 6/2002 | Jeong et al. |
| 2002/0090004 | A1 | 7/2002 | Rinchiuso |
| 2002/0093928 | A1 | 7/2002 | LoGalbo |
| 2002/0093940 | A1 | 7/2002 | Toskala |
| 2002/0116515 | A1 | 8/2002 | Hashimoto |
| 2002/0126629 | A1 | 9/2002 | Jiang |
| 2002/0131375 | A1 | 9/2002 | Vogel |
| 2002/0160744 | A1 * | 10/2002 | Choi .................... H04B 7/2628 455/403 |
| 2002/0181436 | A1 | 12/2002 | Mueckenheim |
| 2002/0187789 | A1 | 12/2002 | Diachina |
| 2002/0191559 | A1 | 12/2002 | Chen |
| 2003/0003920 | A1 | 1/2003 | Sebastian |
| 2003/0007510 | A1 | 1/2003 | Yeo |
| 2003/0016672 | A1 | 1/2003 | Rosen |
| 2003/0043741 | A1 | 3/2003 | Mukai |
| 2003/0050097 | A1 | 3/2003 | Amirijoo |
| 2003/0054829 | A1 | 3/2003 | Moisio |
| 2003/0076812 | A1 | 4/2003 | Benedittis |
| 2003/0078046 | A1 | 4/2003 | Seo |
| 2003/0084185 | A1 | 5/2003 | Pinkerton |
| 2003/0087655 | A1 * | 5/2003 | Matsuoka ............. H04W 36/06 455/502 |
| 2003/0099305 | A1 | 5/2003 | Yi et al. |
| 2003/0103476 | A1 | 6/2003 | Choi |
| 2003/0131124 | A1 | 7/2003 | Yi et al. |
| 2003/0137931 | A1 | 7/2003 | Hans |
| 2003/0139170 | A1 | 7/2003 | Heo |
| 2003/0147371 | A1 | 8/2003 | Choi et al. |
| 2003/0149371 | A1 | 8/2003 | Shiga |
| 2003/0210669 | A1 | 11/2003 | Vayanos |
| 2003/0223393 | A1 | 12/2003 | Lee |
| 2003/0223452 | A1 | 12/2003 | Toskala |
| 2003/0236085 | A1 | 12/2003 | Ho |
| 2004/0002334 | A1 | 1/2004 | Lee |
| 2004/0004954 | A1 | 1/2004 | Terry |
| 2004/0006643 | A1 | 1/2004 | Dolson |
| 2004/0008658 | A1 | 1/2004 | Dahlman |
| 2004/0008659 | A1 | 1/2004 | Kim |
| 2004/0014452 | A1 | 1/2004 | Lim |
| 2004/0028078 | A1 | 2/2004 | Beckmann et al. |
| 2004/0057387 | A1 | 3/2004 | Yi |

(56) References Cited

U.S. PATENT DOCUMENTS

| | | |
|---|---|---|
| 2004/0077357 A1 | 4/2004 | Nakada |
| 2004/0097192 A1 | 5/2004 | Schiff |
| 2004/0103435 A1 | 5/2004 | Yi |
| 2004/0109422 A1 | 6/2004 | Naito |
| 2004/0109433 A1 | 6/2004 | Khan |
| 2004/0114593 A1 | 6/2004 | Dick |
| 2004/0114606 A1 | 6/2004 | Haddad |
| 2004/0116143 A1 | 6/2004 | Love |
| 2004/0117860 A1 | 6/2004 | Yi |
| 2004/0125772 A9 | 7/2004 | Wu |
| 2004/0127223 A1 | 7/2004 | Li |
| 2004/0143676 A1 | 7/2004 | Baudry |
| 2004/0144593 A1 | 7/2004 | Shai |
| 2004/0146019 A1 | 7/2004 | Kim |
| 2004/0147266 A1 | 7/2004 | Hwang |
| 2004/0147271 A1 | 7/2004 | Billon |
| 2004/0157602 A1 | 8/2004 | Khawand |
| 2004/0160919 A1 | 8/2004 | Balachandran et al. |
| 2004/0171395 A1 | 9/2004 | Shin |
| 2004/0176094 A1 | 9/2004 | Kim et al. |
| 2004/0180675 A1 | 9/2004 | Choi |
| 2004/0184437 A1 | 9/2004 | Lee |
| 2004/0185860 A1 | 9/2004 | Marjelund |
| 2004/0196861 A1 | 10/2004 | Rinchiuso |
| 2004/0198369 A1 | 10/2004 | Kwak |
| 2004/0202140 A1 | 10/2004 | Kim |
| 2004/0208160 A1 | 10/2004 | Petrovic |
| 2004/0219920 A1 | 11/2004 | Love |
| 2004/0223507 A1 | 11/2004 | Kuchibhotla |
| 2004/0229626 A1 | 11/2004 | Yi |
| 2004/0248600 A1 | 12/2004 | Kim |
| 2004/0264497 A1 | 12/2004 | Wang |
| 2004/0264550 A1 | 12/2004 | Dabak |
| 2004/0266494 A1 | 12/2004 | Ruuska |
| 2005/0002361 A1* | 1/2005 | Dick ............ H04B 7/2628 370/335 |
| 2005/0008035 A1 | 1/2005 | Eklund |
| 2005/0009527 A1* | 1/2005 | Sharma ........... H04W 76/046 455/445 |
| 2005/0013272 A1 | 1/2005 | Hwang |
| 2005/0014508 A1 | 1/2005 | Moulsley |
| 2005/0020260 A1 | 1/2005 | Jeong |
| 2005/0025039 A1 | 2/2005 | Hwang |
| 2005/0026623 A1 | 2/2005 | Fisher |
| 2005/0039101 A1 | 2/2005 | Torsner |
| 2005/0041573 A1 | 2/2005 | Eom |
| 2005/0054368 A1 | 3/2005 | Amerga |
| 2005/0059407 A1 | 3/2005 | Reed |
| 2005/0059421 A1 | 3/2005 | Reed |
| 2005/0063336 A1 | 3/2005 | Kim |
| 2005/0068963 A1 | 3/2005 | Lee |
| 2005/0073987 A1 | 4/2005 | Wu |
| 2005/0105482 A1 | 5/2005 | Kobayashi |
| 2005/0107036 A1 | 5/2005 | Song |
| 2005/0111393 A1 | 5/2005 | Jeong |
| 2005/0113099 A1 | 5/2005 | Eriksson |
| 2005/0114489 A1 | 5/2005 | Yonge |
| 2005/0118947 A1 | 6/2005 | Ames |
| 2005/0129058 A1 | 6/2005 | Casaccia |
| 2005/0135416 A1 | 6/2005 | Ketchum |
| 2005/0138528 A1 | 6/2005 | Ameigeiras |
| 2005/0157678 A1 | 7/2005 | Mantha |
| 2005/0157696 A1 | 7/2005 | Yamamoto |
| 2005/0169232 A1 | 8/2005 | Sakoda |
| 2005/0185608 A1 | 8/2005 | Lee et al. |
| 2005/0186973 A1 | 8/2005 | Gaal |
| 2005/0190728 A1 | 9/2005 | Han |
| 2005/0195732 A1 | 9/2005 | Huh |
| 2005/0197134 A1 | 9/2005 | McKenna |
| 2005/0207374 A1 | 9/2005 | Petrovic |
| 2005/0213605 A1 | 9/2005 | Kim |
| 2005/0220049 A1 | 10/2005 | Zhang et al. |
| 2005/0232158 A1 | 10/2005 | Hondo |
| 2005/0243767 A1 | 11/2005 | Zhang |
| 2005/0249141 A1 | 11/2005 | Lee |
| 2005/0249222 A1 | 11/2005 | van Kampen et al. |
| 2005/0250500 A1 | 11/2005 | Xu |
| 2005/0251722 A1 | 11/2005 | Terry |
| 2005/0259662 A1 | 11/2005 | Kim |
| 2005/0260997 A1 | 11/2005 | Korale |
| 2005/0265301 A1 | 12/2005 | Heo |
| 2005/0271025 A1 | 12/2005 | Guethaus |
| 2005/0277429 A1 | 12/2005 | Laroia |
| 2005/0281212 A1 | 12/2005 | Jeong |
| 2005/0281219 A1 | 12/2005 | Kim et al. |
| 2005/0281222 A1* | 12/2005 | Ranta-Aho ......... H04W 76/046 370/328 |
| 2005/0288026 A1 | 12/2005 | Byun |
| 2006/0007886 A1 | 1/2006 | Lee et al. |
| 2006/0018289 A1 | 1/2006 | Schulist |
| 2006/0025079 A1 | 2/2006 | Sutskover |
| 2006/0030342 A1 | 2/2006 | Hwang |
| 2006/0034175 A1 | 2/2006 | Herrmann |
| 2006/0045047 A1 | 3/2006 | Choi |
| 2006/0050679 A1 | 3/2006 | Jiang |
| 2006/0056347 A1 | 3/2006 | Kwak |
| 2006/0059186 A1 | 3/2006 | Backlund |
| 2006/0062196 A1 | 3/2006 | Cai |
| 2006/0062312 A1 | 3/2006 | Lee et al. |
| 2006/0072494 A1 | 4/2006 | Matusz |
| 2006/0077892 A1 | 4/2006 | Jiang |
| 2006/0083183 A1 | 4/2006 | Teague |
| 2006/0088009 A1 | 4/2006 | Gibbs |
| 2006/0120403 A1 | 6/2006 | Murata |
| 2006/0143300 A1 | 6/2006 | See |
| 2006/0146745 A1 | 7/2006 | Cai |
| 2006/0146751 A1 | 7/2006 | Obuchi et al. |
| 2006/0153232 A1 | 7/2006 | Shvodian |
| 2006/0154680 A1 | 7/2006 | Kroth |
| 2006/0156370 A1 | 7/2006 | Parantainen |
| 2006/0159102 A1 | 7/2006 | Major |
| 2006/0168343 A1 | 7/2006 | Ma |
| 2006/0193282 A1 | 8/2006 | Ikawa |
| 2006/0256818 A1 | 11/2006 | Shvodian |
| 2006/0258383 A1* | 11/2006 | Jiang ............... H04W 56/0045 455/502 |
| 2006/0282739 A1 | 12/2006 | Meyer |
| 2006/0292982 A1 | 12/2006 | Ye |
| 2007/0060146 A1 | 3/2007 | Won |
| 2007/0071025 A1 | 3/2007 | Bergstrom |
| 2007/0076680 A1 | 4/2007 | Amram et al. |
| 2007/0081483 A1 | 4/2007 | Jang |
| 2007/0081513 A1 | 4/2007 | Torsner |
| 2007/0098006 A1 | 5/2007 | Parry |
| 2007/0099619 A1 | 5/2007 | Parekh |
| 2007/0104151 A1 | 5/2007 | Papasakellariou |
| 2007/0110101 A1 | 5/2007 | Wu |
| 2007/0117579 A1 | 5/2007 | Cai |
| 2007/0121543 A1 | 5/2007 | Kuchibhotla |
| 2007/0133458 A1 | 6/2007 | Chandra |
| 2007/0135080 A1 | 6/2007 | Islam |
| 2007/0140115 A1 | 6/2007 | Bienas |
| 2007/0147315 A1 | 6/2007 | Khoury et al. |
| 2007/0147326 A1 | 6/2007 | Chen |
| 2007/0149206 A1 | 6/2007 | Wang et al. |
| 2007/0191054 A1 | 8/2007 | Das et al. |
| 2007/0206531 A1 | 9/2007 | Pajukoski |
| 2007/0218930 A1 | 9/2007 | Kuo |
| 2007/0254595 A1 | 11/2007 | Yoon et al. |
| 2007/0254656 A1* | 11/2007 | Dalsgaard ............ H04B 7/2681 455/435.1 |
| 2007/0254662 A1 | 11/2007 | Khan |
| 2007/0274253 A1 | 11/2007 | Zhang |
| 2007/0293224 A1* | 12/2007 | Wang ............... H04W 36/0055 455/436 |
| 2008/0004054 A1 | 1/2008 | Barbaresi |
| 2008/0031253 A1 | 2/2008 | Kim |
| 2008/0043619 A1 | 2/2008 | Sammour |
| 2008/0069031 A1 | 3/2008 | Zhang |
| 2008/0076359 A1 | 3/2008 | Charpentier et al. |
| 2008/0095105 A1 | 4/2008 | Sundberg |
| 2008/0130643 A1 | 6/2008 | Jain |
| 2008/0137564 A1 | 6/2008 | Herrmann |
| 2008/0212541 A1 | 9/2008 | Vayanos |

(56) References Cited

U.S. PATENT DOCUMENTS

| | | |
|---|---|---|
| 2008/0232291 A1 | 9/2008 | Hus |
| 2008/0267136 A1 | 10/2008 | Baker |
| 2008/0285501 A1 | 11/2008 | Zhang |
| 2009/0011718 A1 | 1/2009 | Chun |
| 2009/0011769 A1 | 1/2009 | Park |
| 2009/0129330 A1 | 5/2009 | Kim |
| 2009/0156194 A1 | 6/2009 | Meylan |
| 2009/0175241 A1 | 7/2009 | Ohta |
| 2009/0175253 A1 | 7/2009 | Wu |
| 2009/0185477 A1 | 7/2009 | Lee |
| 2009/0225709 A1* | 9/2009 | Wager ............... H04W 72/0413 370/329 |
| 2009/0319850 A1 | 12/2009 | Baek |
| 2009/0323624 A1 | 12/2009 | Kim |
| 2009/0323646 A1 | 12/2009 | Ketchum |
| 2010/0014430 A1 | 1/2010 | Oka |
| 2010/0034095 A1 | 2/2010 | Ho |
| 2010/0103899 A1 | 4/2010 | Kwak |
| 2010/0105334 A1 | 4/2010 | Terry |
| 2010/0226263 A1 | 9/2010 | Chun |
| 2010/0227614 A1 | 9/2010 | Chun |
| 2011/0038376 A1 | 2/2011 | Wiemann |
| 2014/0105190 A1 | 4/2014 | Chun et al. |

FOREIGN PATENT DOCUMENTS

| | | |
|---|---|---|
| CN | 1346191 | 4/2002 |
| CN | 1383626 | 12/2002 |
| CN | 1411668 | 4/2003 |
| CN | 1476267 | 2/2004 |
| CN | 1649285 | 8/2005 |
| CN | 1656840 | 8/2005 |
| CN | 1658545 | 8/2005 |
| CN | 1663158 | 8/2005 |
| CN | 1669350 | 9/2005 |
| CN | 1692661 | 11/2005 |
| CN | 101248699 | 10/2012 |
| DE | 10305358 | 7/2004 |
| EP | 0617875 | 12/1997 |
| EP | 0978958 | 2/2000 |
| EP | 1009184 | 6/2000 |
| EP | 1041850 | 10/2000 |
| EP | 1088415 | 4/2001 |
| EP | 1172766 | 1/2002 |
| EP | 1213939 | 6/2002 |
| EP | 1261222 | 11/2002 |
| EP | 1315342 | 5/2003 |
| EP | 1361514 | 11/2003 |
| EP | 1392074 | 2/2004 |
| EP | 1441473 | 7/2004 |
| EP | 1478203 | 11/2004 |
| EP | 1496639 | 1/2005 |
| EP | 1511245 | 3/2005 |
| EP | 1511245 A2 | 3/2005 |
| EP | 1545040 | 6/2005 |
| EP | 1551113 | 7/2005 |
| EP | 1557968 | 7/2005 |
| EP | 1212853 | 8/2005 |
| EP | 1599063 | 11/2005 |
| EP | 1605724 | 12/2005 |
| EP | 1684538 | 1/2006 |
| EP | 1641189 | 3/2006 |
| EP | 1757135 | 2/2007 |
| GB | 2346779 | 8/2000 |
| JP | 06013959 | 1/1994 |
| JP | 06121001 | 4/1994 |
| JP | 09055693 | 2/1997 |
| JP | 09186704 | 7/1997 |
| JP | 09327072 | 12/1997 |
| JP | 11177621 | 7/1999 |
| JP | 11215192 | 8/1999 |
| JP | 11308671 | 11/1999 |
| JP | 11331949 | 11/1999 |
| JP | 2000032088 | 1/2000 |
| JP | 2000069555 | 3/2000 |
| JP | 2000151494 | 5/2000 |
| JP | 2000175271 | 6/2000 |
| JP | 2000184428 | 6/2000 |
| JP | 2001095031 | 4/2001 |
| JP | 2001298770 | 10/2001 |
| JP | 2001522557 | 11/2001 |
| JP | 2002501695 | 1/2002 |
| JP | 2002064589 | 2/2002 |
| JP | 2002135231 | 5/2002 |
| JP | 2002374321 | 12/2002 |
| JP | 2003008635 | 1/2003 |
| JP | 2003504942 | 2/2003 |
| JP | 2003504968 | 2/2003 |
| JP | 2003078480 | 3/2003 |
| JP | 2003116172 | 4/2003 |
| JP | 2003174470 | 6/2003 |
| JP | 2003333661 | 11/2003 |
| JP | 2004128967 | 4/2004 |
| JP | 2004272771 | 11/2004 |
| JP | 2004320165 | 11/2004 |
| JP | 2004343258 | 12/2004 |
| JP | 2004349884 | 12/2004 |
| JP | 2005500761 | 1/2005 |
| JP | 2005072634 | 3/2005 |
| JP | 2005510950 | 4/2005 |
| JP | 2005517369 | 6/2005 |
| JP | 2005522923 | 7/2005 |
| JP | 2005217743 | 8/2005 |
| JP | 2005525066 | 8/2005 |
| JP | 2005525720 | 8/2005 |
| JP | 2005236988 | 9/2005 |
| JP | 2005237013 | 9/2005 |
| JP | 2005244958 | 9/2005 |
| JP | 2005278167 | 10/2005 |
| JP | 2005536168 | 11/2005 |
| JP | 2005539462 | 12/2005 |
| JP | 2006014372 | 1/2006 |
| JP | 2006020044 | 1/2006 |
| JP | 2006025437 | 1/2006 |
| JP | 2006505998 | 2/2006 |
| JP | 2006352705 | 12/2006 |
| JP | 2007503155 | 2/2007 |
| JP | 2007508749 | 4/2007 |
| JP | 2007536790 | 12/2007 |
| JP | 2008509582 | 3/2008 |
| JP | 2008510424 | 4/2008 |
| JP | 2009284532 | 12/2009 |
| KR | 1020010111634 | 12/2001 |
| KR | 1020010111637 | 12/2001 |
| KR | 1020020077817 | 10/2002 |
| KR | 1020020087560 | 11/2002 |
| KR | 1020020096900 | 12/2002 |
| KR | 1020030064263 | 7/2003 |
| KR | 20030081836 | 10/2003 |
| KR | 1020040048675 A | 6/2004 |
| KR | 1020040058638 | 7/2004 |
| KR | 1020040064867 | 7/2004 |
| KR | 1020040089937 | 10/2004 |
| KR | 1020050019945 | 3/2005 |
| KR | 1020050020459 | 3/2005 |
| KR | 1020050031268 | 4/2005 |
| KR | 1020050046305 | 5/2005 |
| KR | 1020050078635 | 8/2005 |
| KR | 1020050078636 | 8/2005 |
| KR | 1020050078640 | 8/2005 |
| KR | 1020050081511 | 8/2005 |
| KR | 1020050110533 | 11/2005 |
| KR | 1020050119054 | 12/2005 |
| KR | 1020060012210 | 2/2006 |
| RU | 2168278 | 5/2001 |
| RU | 2191479 | 10/2002 |
| RU | 2198479 | 2/2003 |
| RU | 2232469 | 7/2004 |
| RU | 2232477 | 7/2004 |
| RU | 2237380 | 9/2004 |
| RU | 2263415 | 10/2005 |
| RU | 2004117854 | 10/2005 |
| RU | 2005115869 | 10/2005 |

(56) References Cited

FOREIGN PATENT DOCUMENTS

| | | |
|---|---|---|
| RU | 2270526 | 2/2006 |
| TW | 407407 | 10/2000 |
| TW | 548916 | 8/2003 |
| TW | 552815 | 9/2003 |
| TW | 576027 | 2/2004 |
| TW | 586283 | 5/2004 |
| TW | 589818 | 6/2004 |
| TW | 590340 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | I242951 | 11/2005 |
| TW | M283441 | 12/2005 |
| TW | I253824 | 4/2006 |
| TW | 280755 | 5/2007 |
| TW | 200601727 | 7/2012 |
| TW | 200541258 | 4/2013 |
| WO | 1994/09597 | 4/1994 |
| WO | 9944383 | 9/1999 |
| WO | 9960729 | 11/1999 |
| WO | 9963713 | 12/1999 |
| WO | 01/020924 | 3/2001 |
| WO | 0120924 | 3/2001 |
| WO | 01/35692 | 5/2001 |
| WO | 0135586 | 5/2001 |
| WO | 0137473 | 5/2001 |
| WO | 01/86888 | 11/2001 |
| WO | 01/93462 | 12/2001 |
| WO | 01093462 | 12/2001 |
| WO | 0203720 | 1/2002 |
| WO | 0239697 | 5/2002 |
| WO | 0239760 | 5/2002 |
| WO | 02043403 | 5/2002 |
| WO | 0247417 | 6/2002 |
| WO | 02075442 | 9/2002 |
| WO | 02102110 | 12/2002 |
| WO | 03007636 | 1/2003 |
| WO | 03017688 | 2/2003 |
| WO | 03017691 | 2/2003 |
| WO | 03/043259 | 5/2003 |
| WO | 03043259 | 5/2003 |
| WO | 03047155 | 6/2003 |
| WO | 03056723 | 7/2003 |
| WO | 03069934 | 8/2003 |
| WO | 03096571 | 11/2003 |
| WO | 2004/030392 | 4/2004 |
| WO | 04030392 | 4/2004 |
| WO | 04030393 | 4/2004 |
| WO | 2004034656 | 4/2004 |
| WO | 04043012 | 5/2004 |
| WO | 2004045234 | 5/2004 |
| WO | 04/079971 | 9/2004 |
| WO | 04079971 | 9/2004 |
| WO | 2004075442 | 9/2004 |
| WO | 2004089030 | 10/2004 |
| WO | 2004091130 | 10/2004 |
| WO | 04/100598 | 11/2004 |
| WO | 04102901 | 11/2004 |
| WO | 2004100598 | 11/2004 |
| WO | 2005006660 | 1/2005 |
| WO | 2005018144 | 2/2005 |
| WO | 2005018269 | 2/2005 |
| WO | 05039134 | 4/2005 |
| WO | 2005034418 | 4/2005 |
| WO | 2005036917 | 4/2005 |
| WO | 05048616 | 5/2005 |
| WO | 2005050918 | 6/2005 |
| WO | 2005055472 | 6/2005 |
| WO | 2005/074312 | 8/2005 |
| WO | 2005071887 | 8/2005 |
| WO | 2005072073 | 8/2005 |
| WO | 2005074312 A1 | 8/2005 |
| WO | 2005078967 | 8/2005 |
| WO | 2005079021 | 8/2005 |
| WO | 2005088886 | 9/2005 |
| WO | 05101738 | 10/2005 |
| WO | 2005099125 | 10/2005 |
| WO | 05109695 | 11/2005 |
| WO | 05109837 | 11/2005 |
| WO | 05114884 | 12/2005 |
| WO | 05125125 | 12/2005 |
| WO | 2005117317 | 12/2005 |
| WO | 2005119941 | 12/2005 |
| WO | 2005125020 | 12/2005 |
| WO | 06011953 | 2/2006 |
| WO | 2006012946 | 2/2006 |
| WO | 2006033552 | 3/2006 |
| WO | 06118393 | 11/2006 |
| WO | 2007066883 | 6/2007 |
| WO | 2007078155 A2 | 7/2007 |
| WO | 2007091831 | 8/2007 |
| WO | 2007095966 | 8/2007 |

OTHER PUBLICATIONS

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.

3rd Generation Partnership Project (3GPP), "Technical Specification Group Radio Access Network; Introduction of the Multimedia Broadcast Multicast Service(MBMS) in the Radio Access Network (RAN); Stage 2 (Release 6)", 3GPP TS 25.346 V6.7.0, Dec. 2005.

3rd Generation Partnership Project (3GPP); "Technical Specification Group Radio Access Network; Radio Interface Protocol Architecture (Release 6)," 3GPP TS 25.301 V6.4.0, Sep. 2005, XP-0367232, 48 pages.

China Mobile Communications Co., "RRC States Analysis in LTE," R2-052140, 3GPP TSG RAN WG2 #48, Aug. 2005.

Ericsson, "E-UTRA Random Access"; TSG-RAN WG1 #43; Seoul, Korea; Nov. 2005; R1-051445.

Ericsson, "Initial, Random Access and Identity Handling", R2-060592, TSG-RAN WG2 Meeting #51, Feb. 2006, 8 pages, XP50130549.

Ericsson, "LTE States in E-UTRAN," 3GPP TSG-RAN WG2 Meeting #48bis, R2-052425, Oct. 10, 2005.

Ericsson, "Solution for sending NAS together with RRC connection request", 3GPP TSG-RAN WG2#58, R2-071817, May 7, 2007.

Ericsson, "User plane protocol enhancements," R2-052749, TSG-RAN WG2 Meeting #48bis, Oct. 2005.

European Patent Office Application Serial No. 06812408.0, Search Report dated Nov. 22, 2012, 6 pages.

European Patent Office Application Serial No. 07700814.2, Office Action dated Feb. 18, 2013, 5 pages.

European Patent Office Application Serial No. 07700845.6, Office Action dated May 22, 2013, 6 pages.

European Patent Office Application Serial No. 07700865.4, Search Report dated Nov. 8, 2012, 6 pages.

European Patent Office Application Serial No. 07700868.8, Office Action dated Nov. 2, 2012, 7 pages.

European Patent Office Application Serial No. 07708430.9, Search Report dated Jun. 5, 2013, 9 pages.

European Patent Office Application Serial No. 07708765.8, Search Report dated Sep. 28, 2012, 10 pages.

European Patent Office Application Serial No. 07746856.9, Search Report dated Jan. 31, 2013, 8 pages.

European Patent Office Application Serial No. 07747052.4, Search Report dated Mar. 14, 2013, 8 pages.

European Patent Office Application Serial No. 07747053.2, Search Report dated Nov. 13, 2012, 6 pages.

European Patent Office Application Serial No. 07747056.5, Search Report dated Feb. 14, 2013, 7 pages.

European Patent Office Application Serial No. 11001176.4, Search Report dated Oct. 24, 2012, 8 pages.

(56) References Cited

OTHER PUBLICATIONS

European Patent Office Application Serial No. 11004852.7, Search Report dated Nov. 5, 2012, 9 pages.
European Patent Office Application Serial No. 13163775.3, Search Report dated May 27, 2013, 6 pages.
European Patent Office Application Serial No. 7700858.9, Search Report dated Mar. 5, 2013, 6 pages.
European Patent Office Application Serial No. 7700867.0, Search Report dated Feb. 27, 2013, 9 pages.
Frank A. Zdarsky et al.: "Handover in Mobile Communication Networks: Who is in Control Anyway", Proceedings of the 30th EUROMICRO Conference, Aug. 2004, XP10723593.
Huawei, "Further Considerations on Multiplexing Method of Shared Control Channel in Uplink Single-Carrier FDMA," 3GPP TSG-RAN WG1, R1-051430, Nov. 7, 2005.
India Intellectual Property Office Application Serial No. 3088/KOLNP/2008, Office Action dated Jul. 29, 2013, 2 Pages.
Intellectual Property Office of India Application Serial No. 2299/KOLNP/2008, Search Report dated Jun. 27, 2013, 1 page.
Intellectual Property Office of India Application Serial No. 3053/KOLNP/2008, Search Report dated Jul. 8, 2013, 2 pages.
IPWireless, "Layer 2 functions for LTE," 3GPP TSG RAN WG2 #48bis, Tdoc R2-052377, Oct. 2005, 7 pages.
IPWireless, et al., "RACH access optimisation," 3GPP TSG RAN WG2 #59, R2-073186, Jun. 2007, 6 pages.
IPWireless, Tdoc R2-052377; 'Layer 2 Functions for LTE'; 3GPP TSG RAN WG2 #48bis; Cannes, France; Oct. 10, 2005.
Japan Patent Office Application Serial No. 2011-136599, Notice of Allowance dated Jun. 28, 2013, 3 pages.
Japan Patent Office Application Serial No. 2011-219329, Office Action dated Jun. 4, 2013, 3 pages.
Joonsug Chung et al.: "Packet Synchronization and Identification for Incremental Redundancy Transmission in FH-CDMA Systems", 3rd IEEE International Symposium on Personal, Indoor and Mobile Radio Communications, Oct. 1992, pp. 292-295, XP01017082.
Korean Intellectual Property Office Application Serial No. 10-2006-0085190, Office Action dated Feb. 25, 2013, 5 pages.
Korean Intellectual Property Office Application Serial No. 10-2006-0088273, Notice of Allowance dated Mar. 28, 2013, 5 pages.
Korean Intellectual Property Office Application Serial No. 10-2006-0107104, Notice of Allowance dated Apr. 12, 2013, 2 pages.
Korean Intellectual Property Office Application Serial No. 10-2006-0107104, Office Action dated Dec. 20, 2012, 15 pages.
Korean Intellectual Property Office Application Serial No. 10-2007-0000097 Notice of Allowance dated Feb. 6, 2013, 2 pages.
Korean Intellectual Property Office Application Serial No. 10-2007-0000767, Office Action dated Jun. 19, 2013, 3 pages.
Korean Intellectual Property Office Application Serial No. 10-2007-0002962, Office Action dated Sep. 24, 2013, 3 pages.
Korean Intellectual Property Office Application Serial No. 10-2007-0042094, Office Action dated Aug. 26, 2013, 5 pages.
Korean Intellectual Property Office Application Serial No. 10-2007-0060991, Office Action dated Sep. 13, 2013, 5 pages.
LG Electroncs Inc, "MAC Enhancement," 3GPP TSG-RAN WG2 #51, R2-060561, Feb. 2006.
LG Electroncs Inc., "Default SRB for initial access", 3GPP TSG-RAN WG 2 LTE Ad-hoc, R2-061958, Jun. 27, 2006.
LG Electronics, "Initial access for LTE," TSG-RAN Working Group 2 #49, R2-052769, Nov. 2005, 2 pages.
LG Electronics Inc., "Discussion on RLC PDU Structure," R2-070721, 3GPP TSG-RAN WG2 #57, Feb. 2007.
LG Electronics Inc., "HARQ and ARQ Operation," R2-060563, 3GPP TSG-RAN WG2 #51, Feb. 2006.
LG Electronics Inc., "UE state transition in LTE_ACTIVE," 3GPP TSG-RAN WG2 #52, R2-061002, Mar. 2006, 3 pages.
LG Electronics Inc., "Framing in the MAC Entity," 3GPP TSG-RAN WG2, R2-061012, Mar. 27, 2006.
LG Electronics Inc., "HARQ and ARQ Operation," 3GPP TSG-RAN WG2 #50, R2-060106, XP-008128941, Jan. 2006, 5 pages.

LG Electronics Inc., "MAC Architecture of LTE," R2-060105, 3GPP TSG-RAN WG2 #50, Jan. 2006.
M. Haardt et al., "The TD-CDMA Based UTRA TDD Mode," IEEE Journal on Selected Areas in Communications, vol. 18, No. 8, pp. 1375-1385, Aug. 2000.
Motorola, "Paging Channel Design for E-UTRA," 3GPP TSG-RAN WG1, R1-061712, Jun. 27, 2006.
Motorola et al., "MAC-e/es header and functional split," 3GPP TSG-RAN WG2 meeting #45, R2-042360, Nov. 2004.
Nortel, "Proposal for the Uplink Multiple Access Scheme for E-UTRA," 3GPP TSG RAN WG1 #42bis, R1-051165, Oct. 2005, 18 pages.
NTT DoCoMo, et al., "Multiplexing Method of Shared Control Channel in Uplink Single-Carrier FDMA Radio Access," 3GPP TSG-RAN WG1, R1-051143, Oct. 10, 2005.
NTT DoCoMo, et al., "Paging Channel Structure for E-UTRA Downlink," 3GPP TSG-RAN WG1, R1-060034, Jan. 23, 2006.
NTT DoCoMo, INc_, Summary (with revision marks) of email discussion point 3: Initial access procedure: C-RNTI and 3GPP TSG RAN WG2 #56bis, Tdoc-R2-070338, 9 pages.
Panasonic, "E-UTRA Transport and Logical Channels," R2-052860, 3GPP TSG RAN WG2#49, Nov. 2005.
Philips, "Evolved Paging Indicators for LTE," 3GPP TSG-RAN WG2, R2-052985, Nov. 7, 2005.
Philips, "Random Access considerations and discussion of L1 questions from RAN2", R1-060143, 3GPP TSG RAN LTE Adhoc, Jan. 2006, 4 pages, XP50417365.
Qualcomm, "Max number of MAC-hs header extensions", R2-042023, 3GPP TSG-RAN WG2 meeting #44, Oct. 2004.
Qualcomm, "Need for MAC-hs segmentation mechanism," 3GPP TSG-RAN WG2 meeting #28, R2-020769, Apr. 2002.
Qualcomm Europe, "Access procedure for LTE", R2-060362, 3GPP TSG-RAN WG2 LTE, Feb. 2006, 4 XP50130362.
Qualcomm Europe, "Signaling optimization for E-UTRAN," R2-052407, 3GPP TSG-RAN WG 2 meeting #48-bis, Oct. 2005.
R. Thomas Derryberry et al.: "On CDMA 2000 Evolution—Reverse High-Speed Packet Data Physical Layer Enhancements in cdma2000 1xEV-DV", IEEE Communications Magazine, Apr. 2005, vol. 43, No. 4, pp. 41-47, XP001228792.
RAN WG2, "Answer to RAN1 questions on MBMS," 3GPP RAN WG2 Meeting #43, R2-041907, XP-50126506, Aug. 2004, 4 pages.
RAN2, "LTE L1 related questions to RAN1", R1-060061, 3GPP TSG RAN WG1 LTE Ad Hoc Meeting, Jan. 2006, 4 pages, XP50491669.
Sarkar, S., et al., "Common-Channel Soft Handoff in CDMA2000," IEEE Transactions on Microwave Theory and Techniques, Jun. 2000, pp. 938-950, vol. 48, Issue 6.
Siemens, "States in E-UTRAN," R2-052051, 3GPP TSG-RAN WG RAN2#48, Aug. 2005.
Taiwan Intellectual Property Office Application Serial No. 096100583, Office Action dated Mar. 18, 2013, 8 pages.
Taiwan Intellectual Property Office Application Serial No. 096104339, Office Action dated Dec. 6, 2012, 6 pages.
Taiwan Intellectual Property Office Application Serial No. 096104339, Office Action dated May 30, 2013, 5 pages.
Taiwan Intellectual Property Office Application Serial No. 096104517, Certificate dated Sep. 1, 2013, 5 pages.
Taiwan Intellectual Property Office Application Serial No. 096104519, Notice of Allowance dated Apr. 17, 2013, 3 pages.
Texas Instruments, "A new preamble shape for the Random Access preamble in E-UTRA," 3GPP TSG RAN WG1 #44-bis, R1-060867, Mar. 2006, 5 pages.
The State Intellectual Property Office of the People's Republic of China Application Serial No. 200780001894.4, Certificate dated Jul. 17, 2013, 15 pages.
The State Intellectual Property Office of the People's Republic of China Application Serial No. 201110399482.9, Office Action dated Aug. 21, 2013, 6 pages.
U.S. Appl. No. 12/159,981, Office Action dated Jan. 18, 2013, 11 pages.
U.S. Appl. No. 12/293,803, Final Office Action dated Sep. 12, 2013, 14 pages.

(56) References Cited

OTHER PUBLICATIONS

U.S. Appl. No. 12/305,916, Office Action dated Dec. 18, 2012, 12 pages.
U.S. Appl. No. 12/305,920, Final Office Action dated Oct. 4, 2012, 55 pages.
U.S. Appl. No. 13/410,185, Office Action dated Oct. 10, 2012, 71 pages.
U.S. Appl. No. 13/410,221, Office Action dated Oct. 15, 2012, 72 pages.
Xu, H., et al.; "Performance Analysis on the Radio Link Control Protocol of UMTS System"; 2002 IEEE 56th Vehicular Technology Conference Proceedings; pp. 2026-2030; Sep. 2002.
Ericsson, "E-UTRA Random Access," TSG-RAN WG1 #43, R1-051445, XP-003020958, Nov. 2005, 4 pages.
European Patent Office Application Serial No. 07700843.1, Search Report dated Nov. 28, 2013, 8 pages.
European Patent Office Application Serial No. 13190899.8, Search Report dated Dec. 2, 2013, 7 pages.
Korean Intellectual Property Office Application Serial No. 10-2006-0137123, Notice of Allowance dated Dec. 12, 2013, 2 pages.
Korean Intellectual Property Office Application Serial No. 10-2007-0002962, Notice of Allowance dated Mar. 27, 2014, 2 pages.
U.S. Appl. No. 13/874,199, Office Action dated Sep. 23, 2014, 10 pages.
European Patent Office Application Serial No. 07700858.9, Certification dated Mar. 12, 2014, 14 pages.
U.S. Appl. No. 13/677,232, Office Action dated Apr. 25, 2014, 7 pages.
European Patent Office Application Serial No. 14162780.2, Search Report dated May 22, 2014, 7 pages.
Korean Intellectual Property Office Application Serial No. 10-2007-0060991, Notice of Allowance dated Jan. 28, 2014, 2 pages.
European Patent Office Application Serial No. 07708817.7, Certificate dated Jul. 23, 2014, 15 pages.
European Patent Office Application Serial No. 07708765.8, Certificate dated Aug. 27, 2014, 12 pages.
The State Intellectual Property Office of the People's Republic of China Application Serial No. 200780004856.4, Office Action dated Nov. 24, 2014, 8 pages.
The State Intellectual Property Office of the People's Republic of China Application Serial No. 200780001902.5, Final Office Action dated Nov. 25, 2014, 5 pages.
European Patent Office Application Serial No. 07708666.8, Certificate dated Jul. 30, 2014, 20 pages.
3rd Generation Partnership Project (3GPP), "Technical Specification Group Radio Access Network; Physical channels and mapping of transport channels onto physical channels (FDD) (Release 5)," 3GPP TS 25.211 V5.8.0, Dec. 2005, 39 pages.
The State Intellectual Property Office of the People's Republic of China Application Serial No. 201210049981.X, Office Action dated Nov. 4, 2014, 5 pages.
U.S. Appl. No. 12/159,849, Final Office Action dated Jan. 13, 2015, 11 pages.
Ericsson, "User plane protocol enhancements," TSG-RAN WG2 Meeting #48bis, Tdoc R2-052749, Oct. 2005, 4 pages.
LG Electronics Inc., "MAC Architecture of LTE," 3GPP TSG-RAN WG2 #50, R2-060105, Jan. 2006, 4 pages.
LG Electronics Inc., "Discussion on RLC PDU Structure," 3GPP TSG-RAN WG2 #57, R2-070721, Feb. 2007, 3 pages.
LG Electronics Inc., "HARQ and ARQ Operation," 3GPP TSG-RAN WG2 #51, R2-060563, Feb. 2006, 5 pages.
European Patent Office Application Serial No. 07700845.6, Final Office Action dated Feb. 11, 2015, 30 pages.
U.S. Appl. No. 12/159,849, Office Action dated Apr. 10, 2015, 11 pages.
U.S. Appl. No. 14/483,940, Notice of Allowance dated Mar. 18, 2015, 8 pages.
The State Intellectual Property Office of the People's Republic of China Application Serial No. 200780023446.4, Office Action dated Jun. 10, 2015, 10 pages.
U.S. Appl. No. 12/159,849, Office Action dated Sep. 16, 2014, 8 pages.
Intellectual Property Office of India Application Serial No. 3868/KOLNP/2008, Office Action dated Aug. 18, 2014, 2 pages.
3rd Generation Partnership Project, "Technical Specification Group Radio Access Network;Introduction of the Multimedia Broadcast Multicast Service (MBMS) in the Radio Access Network (RAN); Stage 2 (Release 6)", 3GPP TS 25.346, V6.7.0, Dec. 2005, 59 pages.
Taiwan Intellectual Property Office Application Serial No. 96122361, Certificate dated Jan. 21, 2014, 6 pages.
Korean Intellectual Property Office Application Serial No. 10-2007-0042094, Notice of Allowance dated Feb. 19, 2014, 2 pages.
European Patent Office Application Serial No. 07708815.1, Certificate dated Jun. 4, 2014, 18 pages.
Qualcomm, "Max number of MAC-hs header extensions," 3GPP TSG-RAN WG2 meeting #44, R2-042023, Oct. 2004, 6 pages.
European Patent Office Application Serial No. 07700845.6, Final Office Action dated Jul. 30, 2014, 3 pages.
European Patent Office Application Serial No. 07700867.0, Search Report dated Dec. 20, 2013, 5 pages.
European Patent Office Application Serial No. 07708814.4, Certificate dated Dec. 11, 2013, 21 pages.

\* cited by examiner

[Fig. 1]
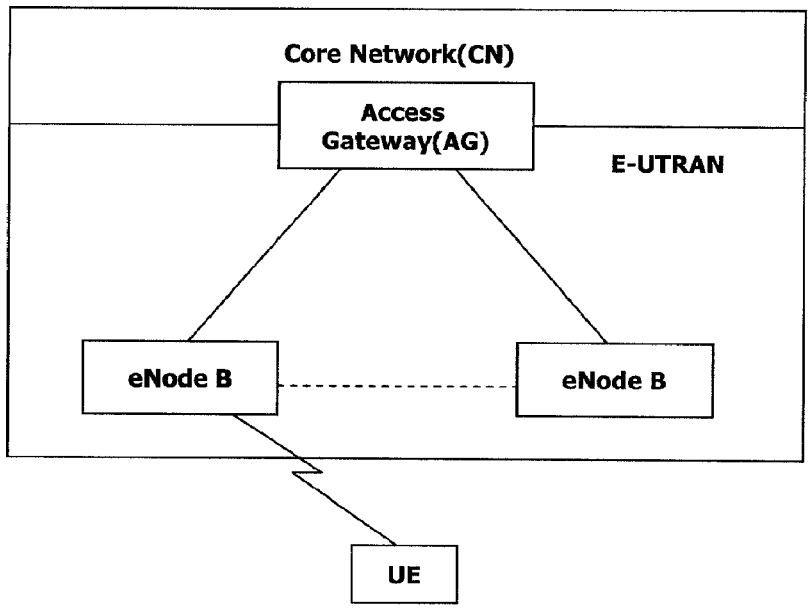
[Fig. 2]
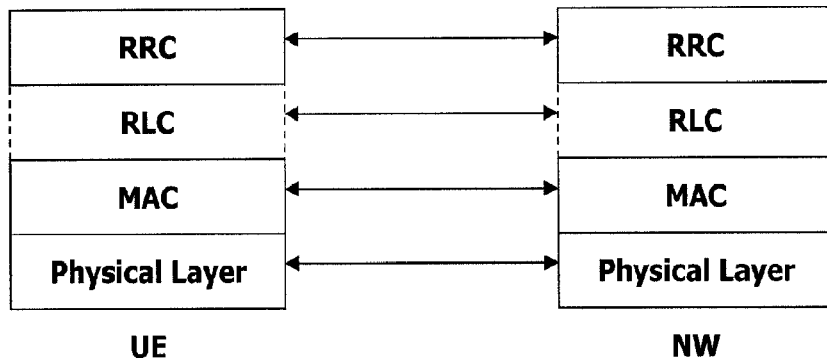
[Fig. 3]
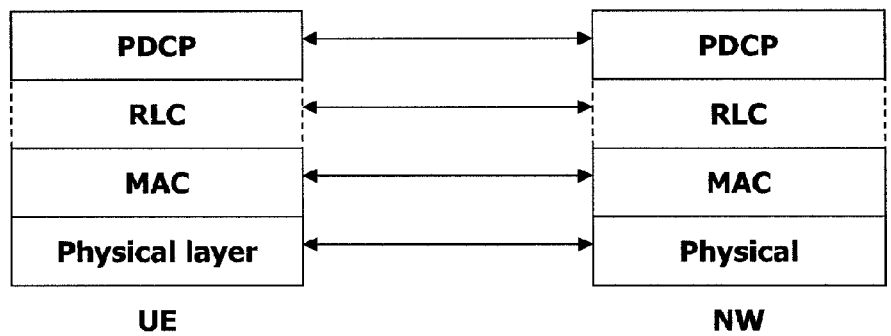

MAINTAINING COMMUNICATION BETWEEN MOBILE TERMINAL AND NETWORK IN MOBILE COMMUNICATION SYSTEM

CROSS-REFERENCE TO RELATED APPLICATIONS

This application is a continuation of U.S. patent application Ser. No. 14/109,801, filed on Dec. 17, 2013, now U.S. Pat. No. 9,253,801, which is a continuation of U.S. application Ser. No. 12/160,099, filed Jul. 3, 2008, now U.S. Pat. No. 8,644,250, which is the National State filing under 35 U.S.C. 371 of International Application No. PCT/KR2007/000080, filed on Jan. 5, 2007, which claims the benefit of earlier filing date and right of priority to Korean Patent Application No. 10-2006-0089326, filed on Sep. 14, 2006, and also claims the benefit of U.S. Provisional Application No. 60/784,976, filed on Mar. 22, 2006, U.S. Provisional Application No. 60/784,680, filed on Mar. 21, 2006, U.S. Provisional Application No. 60/783,250, filed on Mar. 16, 2006 and U.S. Provisional Application No. 60/757,063, filed on Jan. 5, 2006, the contents of which are all hereby incorporated by reference herein in their entirety.

DISCLOSURE OF INVENTION

Technical Solution

This disclosure relates to maintaining communication between a mobile terminal and a network in a mobile communication system.

FIG. 1 illustrates an exemplary network structure of an Evolved Universal Telecommunications System (E-UMTS). The E-UMTS developed from an existing Universal Telecommunications System (UMTS). Standardization of the E-UMTS is currently being developed by a Third Generation Partnership Project (3GPP). The E-UMTS may also be called a Long Term Evolution (LTE) system.

An E-UMTS network may consist of an Evolved UMTS terrestrial radio access network (E-UTRAN) and a core network (CN). The E-UTRAN includes a base station (eNode B or eNB). The CN includes an Access Gateway (AG), which is a node adapted for user registration of a user equipment (UE). The AG may be divided into a first portion for processing user traffic and a second portion for processing control traffic. The AG portion for processing the user traffic and the AG portion for processing the control traffic can be connected to each other via a communication interface.

One or more cells may exist in one eNode B. A plurality of eNode Bs are connected by an interface for transmitting the user traffic and/or control traffic. An interface may also be used in the UMTS to divide the E-UTRAN and the CN.

Radio interface protocol layers between a mobile terminal and network may be classified into a first layer (L1), a second layer (L2) and a third layer (L3) based on three lower layers of a well-known interconnection scheme, such as an Open System Interconnection (OSI) reference model. Among these, the first layer provides an information transfer service using a physical layer. A Radio Resource Control (RRC) layer positioned in the third layer serves to control radio resources between the mobile terminal and the network. Accordingly, the RRC layer allows an RRC message exchange between the mobile terminal and the network. The RRC layer may be positioned in both the eNode B and AG, or positioned in one of the eNode B and AG.

FIGS. 2 and 3 illustrate architectures for radio interface protocols between a mobile terminal and a UMTS terrestrial radio access network (UTRAN) based on a 3GPP radio access network specification. The radio interface protocols of FIGS. 2 and 3 are horizontally formed of a physical layer, a data link layer and a network layer. Vertically, the radio interface protocols are formed of a user plane for transmitting data information and a control plane for transmitting control signals. The protocol layers of FIGS. 2 and 3 may be divided into a first layer (L1), a second layer (L2) and a third layer (L3) based on three lower layers of a well-known interconnection scheme, such as an Open System Interconnection (OSI) reference model.

Hereinafter, radio protocol layers of the control plane illustrated in FIG. 2 and the user plane illustrated in FIG. 3 will be explained. As stated above, a physical layer provides an information transfer service to an upper layer. The physical layer is connected to an upper layer, such as a medium access control (MAC) layer, via a transport channel. Data is transferred between the MAC layer and the physical layer via the transport channel. Data is also transferred between different physical layers, such as a physical layer of a transmitting side and a physical layer of a receiving side.

The MAC layer is positioned in the second layer and provides a service via a logical channel to an upper layer, such as a radio link control (RLC) layer. The RLC layer may also positioned in the second layer and supports reliable data transmission. Notably, a function performed by the RLC layer may be implemented as a functional block within the MAC. In this case, the RLC layer may not exist. A Packet Data Convergence Protocol (PDCP) layer is positioned in the second layer above the RLC layer. The PDCP layer is used to effectively transmit data using an IP packet, such as an IPv4 or IPv6, on a radio interface with a relatively small bandwidth. For this purpose, the PDCP layer reduces unnecessary control information via a function, such as header compression.

A radio resource control (RRC) layer located at a lowest portion of the third layer is defined in the control plane. The RRC layer handles transport channels and physical channels for the configuration, re-configuration and release of radio bearers. Here, a radio bearer (RB) denotes a service provided by the second layer for data transfer between the mobile terminal and the UTRAN.

Downlink transport channels for transmitting data from a network to a mobile terminal may include a broadcast channel (BCH) for transmitting system information and a downlink shared channel (SCH) for transmitting user traffic or a control message. The user traffic or the control message of a downlink multicast or broadcast service may be transmitted via the downlink SCH or via a separate downlink multicast channel (MCH). Uplink transport channels for transmitting data from a mobile terminal to a network may include a random access channel (RACH) for transmitting an initial control message and an uplink shared channel (SCH) for transmitting user traffic or a control message.

Hereinafter, the RLC layer will be explained. The RLC layer basically guarantees a quality of service (QoS) for each RB and their corresponding data transmissions. Because the RB service is a service provided to an upper layer by the second layer of the radio protocols, the entire second layer may impact the QoS. Particularly, the RLC layer greatly influences the QoS. The RLC establishes an independent RLC entity for each RB to guarantee a unique QoS of the RB.

The RLC provides three modes, namely, a transparent mode (TM), an unacknowledged mode (UM) and an acknowledged Mode (AM) to support various QoSs. The three RLC modes support QoS in different manners, respectively, and adapt different operation methods accordingly. Also, detailed functions of the three operation modes are different from one another. Therefore, each of the operation modes (i.e., TM, UM and AM) of the RLC will be described in more detail.

In a UM RLC mode, no reception acknowledgment is received for transmitted data. In an AM RLC mode, a reception acknowledgment is received for transmitted data. When transmitting data in the unacknowledged mode (UM), the UM RLC adds a PDU header, including a sequence number (SN), to each PDU and transmits the PDU to a receiving side. Accordingly, the receiving side can know specifically which PDU is lost during transmission. The UM RLC handles on the user plane the transmission of broadcast/multicast data or real-time packet data such as voice (e.g., VoIP) or streaming in a packet service domain. The UM RLC handles on the control plane the transmission of RRC messages that do not require a reception acknowledgement when the RRC messages are transmitted to a specific terminal within a cell or a specific terminal group.

Similar to the UM RLC, the AM RLC configures a PDU by adding a PDU header having an SN to the PDU. However, the difference between the UM RLC and the AM RLC is that a receiving side acknowledges whether the PDU transmitted by a transmitting side has been successfully received. Notably, when providing the acknowledgement, the receiving side may request the transmitting side to retransmit an unsuccessfully received PDU. Thus, the retransmission function is a distinctive feature of the AM RLC.

The AM RLC aims to guarantee error-free data transmission via use of the retransmission function. Accordingly, the AM RLC handles on the user plane the transmission of non-real-time packet data such as Transport Control Protocol/Internet Protocol (TCP/IP) data in a packet service region. Also, the AM RLC handles on the control plane the transmission of RRC messages that require a reception acknowledgement when the RRC messages are transmitted to a specific terminal within a cell or a specific terminal group.

The TM RLC and the UM RLC are used in uni-directional communication. However, the AM RLC is used in bi-directional communication because of the feedback function from the receiving side. Because the bi-directional communication is usually used in a point-to-point communication, the AM RLC uses a dedicated channel.

The AM RLC is complicated because it performs is the retransmission function. Particularly, the AM RLC is provided with a retransmission buffer in addition to a transmitting/receiving buffer to manage the retransmission. The AM RLC performs various functions including use of a transmission/reception window for flow control, a polling function for when a transmitting side requests status information from a receiving side of a peer RLC entity, a status information report function such as when the receiving side reports its buffer state to a transmitting side of the peer RLC entity, use of a status PDU for delivering status information, and piggybacking for inserting the status PDU in a data PDU to increase data transmission efficiency, for example.

The AM RLC also uses a reset PDU for requesting a reset of all operations and parameters from a counterpart AM RLC entity when the requesting AM RLC entity finds a critical error during the operation. Accordingly, a reset ACK PDU is used to respond to the reset PDU, and the like. The AM RLC uses several protocol parameters, state variables and a timer to support such functions.

PDUs, such as the status information report PDU, the status PDU and the reset PDU, are used to control data transmission in the AM RLC. Such PDUs are referred to as control PDUs. PDUs used to transfer user data is referred to as data PDUs. Therefore, the AM RLC generally uses two types of PDUs, the data PDU and the control PDU.

The E-UMTS is configured with a base station and a terminal. Radio resources in one cell comprise an uplink radio resource and a downlink radio resource. The base station manages allocation and control of the uplink and downlink radio resources of the one cell. Specifically, the base station determines conditions or situations, such as which terminal uses the radio resources, when to use the radio resources, what amount of radio resources to use, and what types of radio resources to use. For example, a base station can determine the transmission of downlink data to a first user for 0.2 seconds on a frequency of 100 Mhz to 101 Mhz after 3.2 seconds have elapsed. Accordingly, the base station informs the corresponding terminal of the determination to allow the terminal to receive the downlink data. Similarly, the base station can determine whether to transmit data based on the conditions or situations (i.e., when to use the radio resources, what amount of radio resources to use, what types of radio resources to use, which terminal uses the radio resources, etc.). The base station also informs the terminal of the determination to allow the terminal to transmit data within the determined time period.

In E-UTRAN system, the base station dynamically manages the radio resources to increase data transmission efficiency. However in UTRAN system, radio resources are managed such that one terminal can continuously use one radio resource during a call connection. This is unreasonable given that various services may be currently provided based on an IP packet. For example, for most packet data services, a packet is generated intermittently rather than being generated continuously. Hence, it is inefficient for the base station to continuously allocate the radio resource to the terminal.

In the E-UTRAN system, the radio resource is allocated to a terminal in the afore-mentioned manner while a terminal has data to transmit. In order words, the E-UTRAN allocates resources to the terminal only when the terminal requires the radio resource.

The E-UTRAN system uses an orthogonal frequency division multiplexing (OFDM) scheme in a physical layer. The OFDM scheme is implemented by dividing a frequency band into certain sizes and allocating each divided band to several terminals. In the OFDM scheme, to prevent unsuccessful data reception transmitted over each frequency band due to a data transmission interruption over another frequency band, synchronization of transmission time between terminals is important. That is, when data transmissions of terminal 1 and terminal 2 are scheduled in a certain time interval, an arrival time of data transmitted by the terminal 1 in the base station should be equal to an arrival time of data transmitted by the terminal 2. If there is any difference between the data arrival time of the terminals 1 and 2, each data transmitted by the terminals 1 and 2 can not be appropriately restored in the base station.

Accordingly, the E-UTRAN system requires an uplink channel transmission of each terminal to be synchronized, for which various methods are being used. One method to synchronize uplink transmission timing is to use a random access channel (RACH). Here, a terminal that does not maintain a synchronized uplink channel with the base station transmits a bit stream preset in the RACH to the base station, namely, a signature. The base station detects the signature and calculates, based on the detected signature, a needed adjustment of transmission time of a terminal (i.e., how much the transmission should be delayed or how much faster should the transmission be performed, for example) for the synchronizing the uplink channel. The base station then informs the terminal of the determination. The terminal accordingly adjusts its transmission time based on the calculated value. Once the transmission time is adjusted, the terminal is synchronized in the uplink channel with the base station.

The present inventors recognized at least the following problems in currently existing procedures for radio resource allocation. Namely, even if an RRC connection is formed between the terminal and the base station, the terminal does not always need to perform an uplink transmission. For example, when a user performs Internet browsing, the user typically downloads a web page for intended viewing. However, upon downloading, the user performs no other action until the user is finished viewing the web page. Thus, during such time, if the terminal continuously performs a transmission to maintain synchronization of the uplink channel, the terminal consumes uplink radio resources and terminal power to no advantage. Based upon such problem recognition, various features and aspects described herein have been conceived by the present inventors.

This disclosure is directed to maintaining communication between a mobile terminal and a network in a mobile communication system.

Additional features and aspects will be set forth in the description that follows, and in part will be apparent from the description, or may be learned by practice of such features. The features and aspects may be realized and attained by the structure particularly pointed out in the written description and claims hereof as well as the appended drawings.

To achieve these and other features and aspects, as embodied and broadly described, this disclosure provides a method for maintaining communication between a mobile terminal and a network in a mobile communication system, the method comprising determining to transition to one of a synchronized state and an unsynchronized state with a network while maintaining an active state with the network, and transitioning to one of the synchronized state and the unsynchronized state according to the determination.

In one aspect, the determining step occurs upon expiration of a timer. Preferably, the timer is started upon transmitting a signal.

In another aspect, the determining step occurs when failing to receive a downlink control channel for a predetermined time period.

In another aspect, the determining step occurs upon receiving a network command.

In another aspect, the determining step occurs upon moving out of a service region.

In another aspect, the determining step occurs upon moving into a new service region.

In another aspect, the determining step occurs upon moving out of a service region and expiration of a timer.

In another aspect, the determining step occurs upon moving over a certain distance.

In another aspect, the determining step occurs upon reaching a certain moving speed.

In another aspect, the determining step occurs upon unsuccessfully transmitting information on a random access channel (RACH) a certain number of times.

In accordance with another embodiment, a method for managing a synchronized state of a mobile terminal in a mobile communication system comprises transmitting first information to a network, wherein the first information is utilized by the network to determine whether the mobile terminal is in one of a synchronized state and an unsynchronized state with the network, and receiving second information from the network according to the determined state of the mobile terminal.

The second information may comprise information related to adjusting a synchronization time between the mobile terminal and the network if the mobile terminal is determined to be in the unsynchronized state.

In one aspect, the first information comprises a request to transition into an unsynchronized state.

In another aspect, the first information comprises a request to transition into an unsynchronized state for a predetermined amount of time.

In a further aspect, the first information comprises a request to transition into a synchronized state.

In accordance with another embodiment, a method for managing a synchronized state of a mobile terminal in a mobile communication system comprises receiving first information from a network according to one of a synchronized and an unsynchronized state of a mobile terminal determined by the network, wherein the first information comprises information related to allocating a radio resource for communication between the mobile terminal and the network, and transmitting second information according to the information related to allocating the radio resource.

The first information may comprise information related to adjusting a synchronization time between the mobile terminal and the network if the mobile terminal is determined to be in the unsynchronized state.

It is to be understood that both the foregoing general description and the following detailed description are exemplary and explanatory, and are intended to provide further explanation of the claims.

The accompanying drawings, which are included to provide a further understanding and are incorporated in and constitute a part of this specification, illustrate various exemplary embodiments and together with the description serve to explain the principles of this disclosure. Features, elements, and aspects of this disclosure that are referenced by the same numerals in different figures represent the same, equivalent, or similar features, elements, or aspects in accordance with one or more embodiments.

FIG. 1 illustrates an exemplary network structure of an Evolved Universal Mobile Telecommunications System (E-UMTS).

FIG. 2 illustrates a control plane architecture for radio interface protocols between a mobile terminal and a UMTS terrestrial radio access network (UTRAN) based on a 3GPP radio access network specification.

FIG. 3 illustrates a user plane architecture for radio interface protocols between a mobile terminal and a UMTS terrestrial radio access network (UTRAN) based on a 3GPP radio access network specification.

Figure 4:
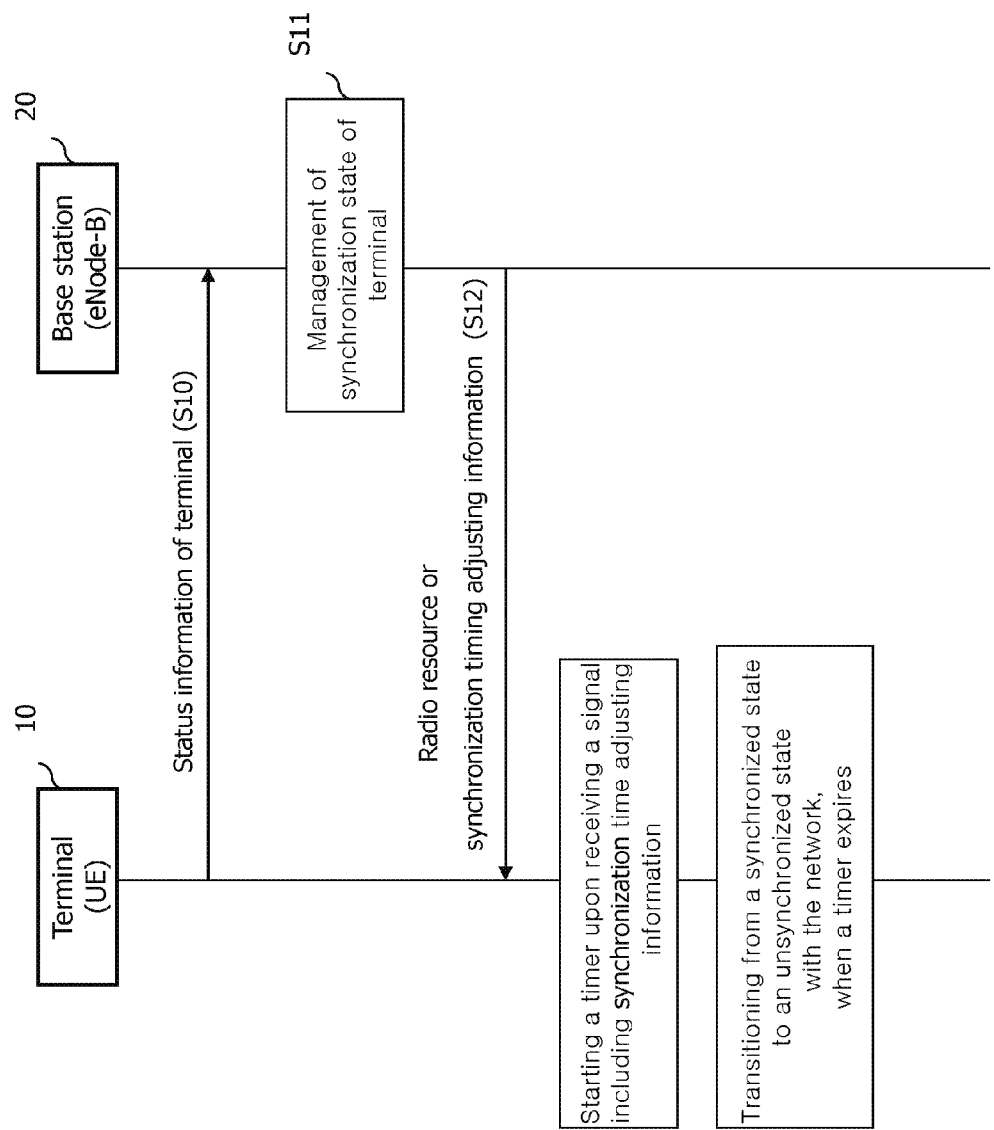
FIG. 4 illustrates an exemplary method for maintaining communication between a mobile terminal and a network in a mobile communication system, in accordance with one embodiment.

This disclosure relates to maintaining communication between a mobile terminal and a network in a mobile communication system.

The features in this disclosure may be implemented in a mobile communication system such as an E-UMTS. However, such may be applied to other communication systems, which are based upon other specifications. Some embodiments will be explained in detail.

This disclosure provides a method for managing a synchronized state of a mobile terminal with a network, which increases a user s satisfaction by allowing a base station to utilize a certain radio resource and decrease a waiting time of a terminal.

Accordingly, a terminal may be managed by dividing a state of the terminal into several lower states according to an activated degree. The features of this disclosure allow dividing of a state of a terminal in an RRC connected state into several lower states according to its activated degree (state). Also, the state of a terminal in an RRC connected state may be divided into several lower states according to an activation or deactivation of a medium access control (MAC) entity. Furthermore, the state of a terminal in an RRC connected state may be divided into several lower states according to whether the terminal is synchronized with a base station.

In accordance with disclosure, a terminal that is in the RRC connected state and is synchronized with a base station over an uplink is referred to as an RRC synchronized terminal. A terminal which is in the RRC connected state and is not synchronized with the base station over an uplink is referred to as RRC unsynchronized terminal. Additionally, the state of the terminal may be divided into a synchronized state and an unsynchronized state.

In general, when a terminal is receiving data from a base station or transmitting data to the base station, the terminal is determined to be in an active state. The terminal receiving data from the base station should be in a synchronized state over an uplink. If not, all data transmissions of the terminal are in a non-synchronized state with the base station. Accordingly, all channel quality indicator (CQI) information or ACK/NACK information, which are transmitted to the base station with regard to the data received from the base station, arrive at the base station in the unsynchronized state. Thus, the base station cannot recognize whether it did not receive the CQI or ACK/NACK because it did not appropriately transmit data to the terminal, or because of a problem with the transmission from the terminal. Accordingly, the data transmission from the unsynchronized terminal to the base station makes no sense.

Furthermore, when a terminal is not synchronized over the uplink, the base station can not appropriately decode any data transmitted from the corresponding terminal. Therefore, for a substantial terminal transmission, the terminal may be synchronized over the uplink while it is transmitting data. As a result, the terminal in the active state may be synchronized over the uplink continuously.

However, a terminal is not always transmitting or receiving data. A terminal that is performing Internet browsing transmits or receives data intermittently. In this case, if the terminal can quickly be synchronized for an uplink direction, the terminal may be allowed to be unsynchronized during a time (interval) in which data is not transmitted or received.

When synchronizing in the uplink direction, the terminal may transition from an unsynchronized state to a synchronized state using a RACH. The terminal may perform a transmission by a certain period to maintain its synchronized state. Accordingly, the base station transmits a new synchronization parameter by continuously sensing a change in the synchronized state of the terminal based on the transmission performed by the certain period. Thus, in order for the terminal to maintain its synchronized state, the terminal preferably performs a transmission within a minimal interval, which indicates use of power.

For example, when a terminal is performing Internet browsing, a data flow is created the moment the user downloads a specific homepage; however, no data flow exists while the user views the completely downloaded homepage. Notably, the terminal is in the synchronized state during the data flow.

In order to maintain the synchronized state during the time of no data flow, the terminal transmits CQI or pilot signals to the base station even if the terminal does not have data to transmit over the uplink. Accordingly, the base station can transmit synchronization information related to the terminal. However, a time interval of a generated transmission/reception between the base station and the terminal is short compared to a time interval when no transmission/reception is generated. Accordingly, when transmitting the CQI or pilot signals to the base station, the terminal unnecessarily and inefficiently requires use of power.

Hence, the features of this disclosure allow managing of a synchronized state of the terminal according to the state of the data flow. FIG. 4 illustrates an exemplary method for maintaining communication between a mobile terminal and a network in a mobile communication system, in accordance with one embodiment.

Referring to FIG. 4, a terminal 10 transmits status information to a base station 20. Afterward, the base station 20 manages a synchronized state of the terminal 10 according to a data flow over a downlink direction and the status information transmitted from the terminal 10 (S11). Accordingly, the base station allocates a radio resource to the terminal or transmits information for adjusting a synchronization time based on the management (S12).

Thus, the terminal is allowed to be in an active (LTE_Active) state or an RRC connected state without being synchronized over the uplink. In other words, the RRC of the terminal and the RRC of the base station maintain their context to enable transmission and reception of messages between the two, but the terminal is not actually synchronized over the uplink direction.

The status information transmitted from the terminal may indicate an amount of data in a buffer of the terminal, priority information related to the data in the buffer of the terminal, service type information, and the like. Managing the synchronized state of the terminal according to the terminal status information may refer to managing the synchronized state of the terminal according to whether the terminal notifies the existence of data to be transmitted over an uplink or downlink.

However, the terminal is directly related to a user, and accordingly can have more information with respect to data flow. That is, although the amount of data over the downlink, or arrival information, can be considered to be managed by the base station, there is a high probability that the downlink data is a response to the user s data transmission over the uplink, namely, the terminal's data transmission over the uplink.

Therefore, the features of this disclosure are implemented such that the terminal directly transmits a message to the base station for requesting a transition of its state. Moreover, the base station adjusts the terminal's state in response to the message. The terminal may transmit a state transition request message to the base station when a certain condition is satisfied. The terminal may be notified of the certain condition by receiving a setup message from the base station or using system information.

When there is no data to be transmitted to or received from the base station for a certain time interval, the terminal may transmit to the base station a message for requesting a transition to an unsynchronized state. The terminal can also transmit time information. The time information may include information for indicating how long a time the terminal wishes to be in the transitioned state. For example, if data transmission/reception is not performed for a specific amount of time, such as 10 seconds, the terminal informs the base station of the specific amount of time (10 seconds). The base station then transitions the state of the terminal to the unsynchronized state for the specific amount of time.

If the base station indicates a time for which the terminal should be in the unsynchronized state, the terminal stays in the unsynchronized state for the corresponding time and then transitions to the synchronized state. Here, the terminal can be synchronized over the uplink using a RACH channel. Accordingly, the base station can allocate a designated radio resource to the terminal at a time when the terminal is intended to transition to the synchronized state.

If the designated radio resource is allocated by the base station, the terminal performs synchronization in the uplink direction using the allocated radio resource. If a radio resource is not allocated, the terminal may remain in the unsynchronized state for a designated time. The time for which the terminal remains in the unsynchronized state may be the same as, or a multiple of, the time in which the terminal was previously in the unsynchronized state.

Therefore, when a certain condition is satisfied, the terminal transmits a state transition message for requesting a state transition from the base station. The base station then determines whether to allow the terminal to transition states. Thereafter, according to determination, the base station transmits a state transition acceptance message or state transition refusal message to the terminal.

During such process, the base station and the terminal can negotiate with each other about how long a time the terminal will stay in a new state. Thus, the terminal or the base station transmits to its counterpart a message suggesting the new state and a time to stay in the new state. The base station or the terminal having received the message transmits a message for indicating an acceptance of the suggestion or a message suggesting a new state or time. The new state may be an unsynchronized state or a synchronized state.

Moreover, during such process, the unsynchronized terminal receives a downlink control channel by a certain time period. Thus, even if the terminal transitions to the unsynchronized state because no data is transmitted or received for a certain time period, the terminal receives a downlink control channel by a certain time period to determine whether there exists a radio resource newly allocated to the terminal. In other words, the terminal determines by the certain time period whether there exists newly arrived data over a downlink.

In general, operations of the terminal in the unsynchronized state are different from those of the terminal in the synchronized state. The synchronized terminal is synchronized over an uplink. Thus, if radio resources are appropriately divided, the base station can detect a signal of the terminal at any time, and accordingly transmit data to the terminal at any time. In contrast, when the terminal is in the unsynchronized state, a signal of the terminal can not be detected. Accordingly, the base station first synchronizes with the terminal before transmitting actual data. Therefore, it is apparent that the synchronized terminal performs a different operation from the unsynchronized terminal in order to transmit data. Moreover, if the terminal in the unsynchronized state performs the same operations as the terminal in the synchronized state, performance of an entire system may be degraded. Accordingly, it is important to recognize whether the terminal is in the synchronized state or unsynchronized state.

Therefore, this disclosure provides methods for determining a state (i.e., synchronized state or unsynchronized state) of a terminal. In accordance with one embodiment, a first method determines a state of the terminal using a timer. The terminal may use a timer in relation to a terminal transmission. Upon transmitting data to the base station, the terminal restarts the timer. Thereafter, upon expiration of the timer, the terminal determines that it is no longer synchronized over an uplink and transitions to the unsynchronized state accordingly.

The terminal may be informed of a set value of the timer by the base station or using system information. The terminal transmission may comprise data that the terminal actually transmits over an uplink or one of pilot, CQI and ACK/NACK signals, which are used to manage uplink and downlink channels of the terminal.

In accordance with another embodiment, a second method determines a state of the terminal using explicit signaling. Here, the base station uses a message to indicate (command) the terminal to move to an unsynchronized state. Upon receiving the message, the terminal transitions to the unsynchronized state. Notably, the terminal may not immediately transition to the unsynchronized state. The terminal may transition to the new state after a certain time elapses using a timer.

The message transmitted from the base station to the terminal can be transmitted via RRC signaling or MAC signaling. Also, the message transmitted from the base station to the terminal may use signaling of a physical layer or a channel for transmitting scheduling information.

If the base station requires a response to its indication (command), the terminal transmits a response message to the base station for indicating the transition to the new state. If the base station does not allow the terminal's uplink transmission, the terminal considers itself as no longer establishing a synchronization in the uplink direction. Here, when the base station does not allow the uplink transmission by the UE, the base station does not allocate any resources that can be used to transmit an ACK/NACK signal, a pilot signal or a CQI signal, or does not allocate any radio resource that is used for the transmission in the uplink direction. Therefore, if a new message received by a terminal from the base station is a message indicating removal of a radio resource allocated to the terminal or termination of the radio resource allocation, the terminal determines that it is no longer synchronized over the uplink after receiving the message.

In accordance with another embodiment, a third method determines a state of the terminal using information related to movement of the terminal. In one example, when the terminal moves into a new cell, the terminal considers itself to be in the unsynchronized state over the uplink direction. The terminal continues to be in the unsynchronized state until performing a transmission in the new cell or performing a RACH process to synchronize over the uplink direction.

In another example, the terminal may move out of a service region after being located in one cell. Thus, when the terminal can not find a base station the terminal can operate with or the terminal has moved out of a service region of the base station, the terminal determines that it is not synchronized with the base station in the uplink direction. Therefore, the terminal considers itself to be in the unsynchronized state.

In a further example, the terminal operates a timer as soon as it leaves a current service region or a service region of the base station. If the terminal does not return to the service region before the expiration of the timer, or if the terminal does not synchronize with the base station in the uplink direction before the expiration of the timer, the terminal considers itself to be in the unsynchronized state. Therefore, upon the expiration of the timer, the terminal transitions to the unsynchronized state.

In yet another example, when the terminal moves over a certain distance or moves a certain distance away from the base station, the terminal considers itself to be in the unsynchronized state toward the uplink. Moreover, if a moving speed is more than a certain threshold, the terminal considers itself transitioned to the unsynchronized state. Here, the terminal can adjust (add or subtract) a timer value according to the moving speed in addition to the timer reference. For example, if a set value of the transmission related timer is one second when the terminal moves 10 km/h, the set value may be set to 0.2 seconds (⅕ of one second) when moving 50 km/h, and 0.1 seconds (¹⁄₁₀ of one second) when moving 100 km/h. Therefore, the set value of the unsynchronized transition related timer used by the terminal or the transmission related timer can be adjusted by addition or subtraction. Moreover, its ratio can be adjusted according to the moving speed of the terminal. The terminal may be informed of the distance reference or the moving reference by the base station.

In accordance with another embodiment, a fourth method determines a synchronized state of the terminal by coping with an erroneous situation. A RACH resource used by the terminal can be divided into a synchronous RACH, used when the terminal is in a synchronized state toward an uplink, and a non-synchronous RACH, used when the terminal is in the unsynchronized state toward the uplink. The synchronous RACH may be used for requesting a radio resource from the base station when the terminal is in the synchronized state and has new data to transmit but no radio resource is allocated for transmitting the data over the uplink. However, a problem may occur when a terminal that is not in the synchronized state erroneously determines itself to be in the synchronized state and uses the synchronous RACH accordingly. Consequently, such terminal may interrupt an operation of another terminal actually in the synchronized state and using the synchronous RACH.

Hence, according to this disclosure, when a terminal in the synchronized state unsuccessfully uses the synchronous RACH a certain number of times, or for a certain time period, the terminal transitions to an unsynchronized state. Here, the unsuccessful use of the synchronous RACH indicates that the terminal has not received any response from the base station in spite of the synchronous RACH transmission. A response from the base station may indicate that the synchronous RACH transmission has been detected or indicates a message related to a radio resource allocation with respect to terminal access. Here, the base station informs the terminal of a reference related to the number of times or time of the unsuccessful use of the RACH.

When the terminal in the synchronized state meets a pre-configured condition, the terminal may transition to the unsynchronized state. That is, the features of this disclosure may maintain and manage several lower states of the terminal according to its synchronized state, thus allowing the terminal to be in one state. When a certain event is generated or a certain condition is met, the terminal transitions to another state and operates in a new lower state.

When the base station has data to transmit to the unsynchronized terminal, or the unsynchronized terminal has data to transmit over an uplink, the terminal preferably synchronizes with the base station over the uplink. However, use of a typical RACH, namely a channel on which collision may occur due to other terminals using the same radio resource, takes a longer time when the terminal synchronizes over the uplink. Therefore, the base station allocates a particular RACH signature to terminals to allow an unsynchronized terminal to quickly synchronize toward the uplink direction.

When a terminal in an RRC connected state must synchronize toward the uplink direction while in an unsynchronized state, the terminal may perform a RACH transmission using a signature allocated from the base station. Since the particular signature is limited to a certain terminal, it is advantageous to relatively decrease the occurrence of collisions between signatures and between terminals.

Therefore, to achieve fast synchronization of the terminal in the unsynchronized state toward the uplink direction, the base station allocates a particular radio resource to a terminal. That is, upon having data to transmit to a terminal in an unsynchronized state, the base station informs the terminal of the existence of downlink data. Simultaneously, the base station informs the terminal of a particular radio resource allocation. The terminal then performs an operation to synchronize toward the uplink direction using the allocated radio resource. The base station may inform the terminal of the particular radio resource through a channel for transferring scheduling information to the terminal.

Thus, the terminal in the unsynchronized state may obtain synchronization in the uplink direction by using the RACH. Here, upon receiving a response indicating timing adjustment from the base station or receiving a radio resource allocated by the base station, the terminal transits to the synchronized state. Furthermore, when the base station allocates information related to managing the radio resource, the terminal transits to the synchronized state. The information related to managing the radio resource may indicate a radio resource for transmitting a CQI, ACK/NACK or pilot signal.

In one aspect, the terminal in the synchronized state may transmit a resource request message to the base station. If the terminal in the synchronized state transmits a pilot signal periodically, the terminal can add a one-bit message to the pilot signal to indicate whether it requests a resource. For example, if a pilot pattern is +1, the pilot pattern indicates that the terminal requests a resource. If the pilot pattern is 1, the pilot pattern indicates that the terminal does not request a resource. Therefore, if the terminal has data to transmit, the pilot pattern is +1.

In another aspect, the base station may indicate the terminal to perform a transmission toward an uplink direction by a certain time interval. This allows the terminal transitioned to the synchronized state to maintain its synchronization. The terminal then performs another transmission after a certain time elapses after its last transmission. Here, the terminal can use a synchronous RACH. In this case, the base station can directly allocate a particular signature to the terminal to more efficiently synchronize the terminal. Thus, the terminal to which the particular signature is allocated performs an uplink RACH transmission using the corresponding signature to be synchronized.

The base station may allocate a particular radio resource to the terminal for every certain time, whereas the terminal forms an arbitrary data block even if there is no data to be transmitted, and transmits the data block to the base station.

The base station may allocate a particular radio resource to maintain synchronization of the terminal. In this case, the base station can notify the terminal through a channel for informing the terminal of the radio resource allocation that the radio resource is used for the synchronization.

The data block may include status information related to the terminal. In this case, the status information related to the terminal may include information regarding an amount of data stored in a buffer of the terminal, extra power of the terminal, or measurement information with respect to neighboring base stations.

During the process, when a RACH is transmitted from the terminal, the base station senses the RACH connection. Thereafter, when the terminal is not synchronized in the uplink direction, the base station transmits to the terminal information for adjusting the synchronization timing. The information for adjusting the synchronization timing may be transmitted through a channel for transferring scheduling information to the terminal.

The information for adjusting the synchronization timing may be transmitted using a designated particular radio resource through the channel for transferring scheduling information to the terminal. When allocating a particular radio resource to the terminal, the base station indicates the terminal to receive contents transmitted in the particular radio resource using a certain identifier on a channel for transferring scheduling information. That is, the terminal having performed the RACH transmission may continuously receive the channel for transferring the scheduling information. Thereafter, when finding a particular indicator or identifier, the terminal may receive a radio resource indicated by the particular indicator or identifier.

As described above, this disclosure provides a method for effectively managing a state of a terminal, whereby a radio resource is used more efficiently and usage time of a terminal battery is prolonged.

Although the features in this disclosure are described in the context of mobile communication, such features may also be used in any wireless communication systems using mobile devices, such as PDAs and laptop computers equipped with wireless communication capabilities. Moreover, the use of certain terms to describe various features herein should not limit the scope of this disclosure to certain type of wireless communication system, such as UMTS. The present teachings are also applicable to other wireless communication systems using different air interfaces and/or physical layers, for example, TDMA, CDMA, FDMA, WCDMA, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which the exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of this disclosure, and that the article of manufacture may comprise any information bearing medium known in the art.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for maintaining a communication between a mobile terminal and a network in a mobile communication system, the method comprising:

determining whether a state of the mobile terminal is in an unsynchronized state while maintaining a radio resource control (RRC) connected state with the network, wherein, when a specific timer is not running in the RRC connected state with the network, the state of the mobile terminal is an unsynchronized state such that the unsynchronized state corresponds to when the specific timer has not started or to when the specific timer has expired;

if it is determined that the state of the mobile terminal is in the unsynchronized state while maintaining the RRC connected state with the network, performing, by the mobile terminal, a random access channel (RACH) procedure for a synchronized state in order to allocate one or more radio resources for an uplink data transmission; and after performing the RACH procedure:

while maintaining the RRC connected state with the network, releasing, by the mobile terminal, the one or more allocated radio resources when the specific timer expires, and while maintaining the RRC connected state with the network, transitioning, by the mobile terminal, the state of the mobile terminal from the synchronized state to the unsynchronized state with the network when the specific timer expires.

2. The method of claim 1, wherein the specific timer is started after receiving a signal related to the specific timer from the network.

3. The method of claim 2, wherein the signal related to the specific timer is a timing advance command (TAC), and the specific timer is time alignment timer (TAT).

4. The method of claim 1, wherein the RACH procedure is performed in order to obtain information related to a time alignment for the uplink data transmission.

5. The method of claim 1, wherein the RACH procedure is performed by using a signature.

6. The method of claim 1, wherein all of the one or more radio resources allocated to the mobile terminal are released when the specific timer expires.

7. The method of claim 1, wherein the RACH procedure is not performed if it is determined that the state of the mobile terminal is a synchronized state while maintaining the RRC connected state with the network.

8. A mobile terminal for maintaining communication with a network in a mobile communication system, the mobile terminal comprising:
   a processor configured to:
      determine whether a state of the mobile terminal is in an unsynchronized state while maintaining a radio resource control (RRC) connected state with the network,
      wherein, when a specific timer is not running in the RRC connected state with the network, the state of the mobile terminal is an unsynchronized state such that the unsynchronized state corresponds to when the specific timer has not started or to when the specific timer has expired;
      if it is determined that the state of the mobile terminal is in the unsynchronized state while maintaining the RRC connected state with the network, perform a random access channel (RACH) procedure for a synchronized state in order to allocate one or more radio resources for an uplink data transmission; and
      after performing the RACH procedure:
         while maintaining the RRC connected state with the network, release the one or more allocated radio resources when the specific timer expires, and while maintaining the RRC connected state with the network, transition the state of the mobile terminal from the synchronized state to the unsynchronized state with the network when the specific timer expires.

9. The mobile terminal of claim 8, wherein the specific timer is started after receiving a signal related to the specific timer from the network.

10. The mobile terminal of claim 9, wherein the signal related to the specific timer is a timing advance command (TAC), and the specific timer is time alignment timer (TAT).

11. The mobile terminal of claim 8, wherein the RACH procedure is performed in order to obtain information related to a time alignment for the uplink data transmission.

12. The mobile terminal of claim 8, wherein the RACH procedure is performed by using a signature.

13. The mobile terminal of claim 8, wherein all of the one or more radio resources allocated to the mobile terminal are released when the specific timer expires.

14. The mobile terminal of claim 8, wherein the RACH procedure is not performed if it is determined that the state of the mobile terminal is a synchronized state while maintaining the RRC connected state with the network.

\* \* \* \* \*